(12) United States Patent
Johnson (10) Patent No.: US 7,147,451 B2
(45) Date of Patent: Dec. 12, 2006

(54) APPARATUS FOR RESTORING THE NECKED-DOWN END OF A TUBULAR CORE

(75) Inventor: John Woody Johnson, Union, SC (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 10/948,481

(22) Filed: Sep. 23, 2004

(65) Prior Publication Data

US 2005/0037103 A1  Feb. 17, 2005

Related U.S. Application Data

(62) Division of application No. 10/154,084, filed on May 22, 2002.

(51) Int. Cl.
*B29C 43/02* (2006.01)

(52) U.S. Cl. .................. 425/343; 425/384; 425/393

(58) Field of Classification Search ............ 425/343, 425/384, 392, 393
See application file for complete search history.

(56) References Cited

U.S. PATENT DOCUMENTS

| | | | |
|---|---|---|---|
| 783,913 A | 9/1903 | Jones et al. | |
| 1,682,125 A | 8/1928 | Hennessy | |
| 1,884,131 A | 10/1932 | Neidich | |
| 3,158,355 A | 11/1964 | Deussen | |
| 3,293,018 A | 12/1966 | Doty | 65/109 |
| 3,368,011 A | 2/1968 | Daniel | 264/72 |
| 3,557,278 A | 1/1971 | Kuhlemann | 264/318 |
| 3,792,847 A | 2/1974 | Amoser | 264/26 |
| 3,806,301 A | 4/1974 | Osterhagen et al. | 425/393 |
| 3,817,677 A | 6/1974 | Seefluth | 425/393 |
| 3,843,300 A | 10/1974 | McFarlane | 425/384 |
| 3,856,906 A | 12/1974 | Edgar | 264/138 |
| 4,008,028 A | 2/1977 | Ronden et al. | 425/145 |
| 4,059,379 A | 11/1977 | Korff et al. | 425/393 |
| 4,083,918 A | 4/1978 | Ronden et al. | 264/297 |
| 4,177,237 A | 12/1979 | Ueno et al. | 264/296 |
| 4,204,823 A | 5/1980 | Hayes et al. | 425/393 |
| 4,207,283 A | 6/1980 | French et al. | 264/322 |
| 4,276,010 A | 6/1981 | Shartzer | 425/143 |
| 4,323,337 A | 4/1982 | Korff et al. | 425/155 |
| 4,373,894 A | 2/1983 | Peppel | 425/393 |
| 4,406,852 A | 9/1983 | Riegel | 264/296 |

(Continued)

FOREIGN PATENT DOCUMENTS

GB  2033826  5/1980

(Continued)

*Primary Examiner*—Joseph S. Del Sole
(74) *Attorney, Agent, or Firm*—DLA Piper US LLP (57) ABSTRACT

An apparatus for restoring a necked-down end of a plastic core includes molding and curing stations and a core handling system having a carriage for sequentially positioning the core adjacent the stations. The molding and curing stations are heated and cooled, respectively, by heating elements and a chilled coolant. A core handling system includes a core-supporting carriage slidably supported on first rails for engagement between the core and the stations. The first rails are slidably supported on perpendicularly oriented second rails to provide for sequential alignment of the carriage with the molding and curing stations. A control system includes motor drives controlled by a programmable logic controller having a processor. Sensors communicate signals to the processor representing the position of the carriage with respect to the upper rails and the position of the upper rails with respect to the lower rails for actuation and control of the motor drives.

16 Claims, 6 Drawing Sheets

U.S. PATENT DOCUMENTS

| | | | |
|---|---|---|---|
| 4,522,579 A | 6/1985 | Rotondo et al. | 425/126 R |
| 4,525,136 A | 6/1985 | Rowley | 425/384 |
| 4,545,951 A | 10/1985 | Gordon | 264/322 |
| 4,642,043 A | 2/1987 | Schwarzkopf | 425/547 |
| 4,750,961 A | 6/1988 | Pflug et al. | 156/212 |
| 4,775,501 A | 10/1988 | Rosenzweig et al. | 264/450 |
| 4,849,152 A | 7/1989 | Rumberger | 264/308 |
| 4,880,579 A | 11/1989 | Murata et al. | 264/26 |
| 4,975,234 A | 12/1990 | Parmann | 264/249 |
| 5,342,570 A * | 8/1994 | Ledoux et al. | 264/566 |
| 5,620,719 A | 4/1997 | Savioli | 425/387.1 |
| 5,736,085 A | 4/1998 | Brown et al. | 264/161 |
| 5,827,467 A | 10/1998 | Ruppert et al. | 264/322 |
| 5,851,464 A | 12/1998 | Davila et al. | 264/103 |
| 6,136,247 A | 10/2000 | Rhoades | 264/230 |
| 6,220,846 B1 | 4/2001 | Savioli et al. | 425/174.8 R |

FOREIGN PATENT DOCUMENTS

| | | |
|---|---|---|
| JP | 53001269 | 1/1978 |
| JP | 53077282 | 7/1978 |
| JP | 60107322 | 6/1985 |
| JP | 2001-294365 | 10/2001 |

* cited by examiner

APPARATUS FOR RESTORING THE NECKED-DOWN END OF A TUBULAR CORE

CROSS-REFERENCE TO RELATED APPLICATION

This is a divisional of co-pending application Ser. No. 10/154,084, filed May 22, 2002.

FIELD OF THE INVENTION

The present invention relates generally to apparatuses for shaping a plastic core, and more particularly to an apparatus for restoring a necked-portion of a cut plastic core by heating the plastic to its softening temperature and molding the end.

BACKGROUND OF THE INVENTION

In the film industry, film products are wound onto tubular plastic cores for handling and storage of the products. It is desirable to form the plastic cores from olefins, such as polypropylene, because of its relatively low cost. The plastic cores are made from tubing in a continuous extrusion process. The continuously extruded plastic core, however, must be cut into lengths to form cores of a suitable length. Inward pressure applied on the extruded plastic tubing during the cutting process results in localized deformation, or neck-down, of the tube adjacent to the cut ends of the cores. The neck-down involves inward deflection of the tube from its nominal dimensions that occurs without change in the thickness of the tube. The neck-down is particularly pronounced when the tube is cut without a mandrel inside the tube. Even when an inner mandrel is present during the cutting, however, some neck-down will still occur, most likely resulting from stress relief acting on the cut end.

Driven end plugs received in opposite ends of the tubular core may provide for winding rotation the tubular core. Alternatively, rotation may be provided by a mandrel received within the interior of the core. Torque is transferred to the core through frictional forces developed between the inner surface of the core and the end plugs or mandrel. To provide for an engagement between the drive members and the core that results in suitable friction, the dimensions of the respective engaging surfaces have close tolerances. The neck-down of the core ends associated with cutting, however, causes an inward deflection of the core inner surface. Such change in the dimensions of the inner surface detrimentally affects the engagement between the core and the drive member frequently rendering the core unusable. As discussed above, the neck-down of the core ends also results in inward deflection of the outer surface of the core on which the film product is wound. Non-uniformity in the outer dimensions of the core undesirably causes stretching of the film during winding of the film onto the necked-down core.

It is known to bell the ends of pipe made from plastic, such as polyvinyl chloride, to provide for end-to-end connection of transportable lengths of the pipe to form a conduit for conveying fluids or for containing electrical wiring for example. As described in U.S. Pat. No. 4,008,028 to Ronden et al., the pipes are belled by heating the end of the plastic tube to the softening temperature of the plastic and outwardly expanding the end of the pipe from its nominal dimensions against a shaping mandrel. In Ronden, lengths of the pipe to be belled are transported along a conveyor to heating and belling stations. Heating and belling heads are moveably mounted at the respective stations for advancement and retraction of the heads with respect to the conveyor. The movement of the heads provides for engagement of the heads with ends of the pipe.

The outward deformation of the pipe resulting from the belling process, however, causes thinning of the pipe wall from its nominal dimensions. In U.S. Pat. No. 4,406,852 to Riegel, the end of the pipe is thickened from its nominal dimensions to provide for the thinning associated with the belling process. To thicken the end of the pipe, the pipe is heated to its softening temperature and axially driven into an annular chamber having the desired dimensions for the thickened portion.

In known belling processes, the outwardly deformed pipe end is sometimes cooled prior to its separation from the shaping mandrel. In U.S. Pat. Nos. 4,008,028 and 4,083,918 (both to Ronden et al.), for example, a cooling ring is provided at the belling station to direct cooled air onto the pipe end. In U.S. Pat. No. 4,059,379 to Korff et al., the mandrel includes internal passages for circulation of either a heated fluid to facilitate the belling process or a fluid to facilitate cooling of the pipe before its removal from the mandrel. The location of the cooling means at the belling station in the Ronden and Korff devices, however, provides for an inefficient system in terms of heat transfer. To facilitate the outward deformation of the pipe, the pipe end must be maintained in a heat softened condition during the belling process. Therefore, the cooling means located at the belling station in Ronden and Korff cannot be active during the belling process and must be activated periodically after belling has been completed. As a result, the heat that is required for maintaining the pipe end in a heat softened condition for belling must be repeatedly added and then removed during each process cycle.

SUMMARY OF THE INVENTION

According to the present invention there is provided an apparatus for restoring a necked-down end of a tubular plastic core. The apparatus includes a molding station defining an annular shaping chamber and a source of heat, preferably heating elements, connected to the molding station. The apparatus further includes a curing station having a fixation member and a cooling system, preferably including a coolant circulated through a chamber defined by the fixation member.

The apparatus further includes a core handling system for sequentially positioning the end of a core adjacent the molding station and the curing station for engagement between the core and the shaping chamber and the fixation member, respectively. The core handling system includes a carriage having at least one support member engageable with the core. The core handling system preferably includes first rails to which the carriage is slidably connected to provide for engagement and disengagement between the core and the stations. The core handling system also preferably includes second rails oriented perpendicular to the first rails. The first rails are slidably connected to the second rails to provide for sequential alignment of the carriage with the molding station and the curing station. The core handling system also preferably includes first and second motor drives for powered translation of the carriage.

The apparatus preferably includes a control system including a programmable logic controller having a processor responsive to control signals representing operating parameters for control of at least one component or system.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE DRAWINGS

Referring to the drawings where like numerals refer to like elements, there is shown a device 10 for restoring a necked-down portion of a tubular plastic core 12 at an end 14 of the core formed in a cutting process. The device 10 includes a molding station 16 and a curing station 18 located beside each other on a base structure 20. In the manner to be described in greater detail, the plastic core 12 is shaped at the molding station 16 to restore an end 14 of the core 12 that has been necked-down in a cutting process. The process is, therefore, distinguishable from belling processes in which outward deformation of a plastic pipe, to form a socket for example, results in thinning of the wall. In the method of the present invention, there is no change in the thickness of the wall. Instead, the tube end is shaped to restore a necked-down portion of the core to the nominal dimensions for the tube.

The plastic core 12 is formed from continuously extruded tubing that has been cut into suitable lengths for supporting a plastic or paper product, for example, wound onto the core 12. The extruded tubing from which the cores 12 preferably has a wall thickness that is less than 0.5 inch and most preferably has a wall thickness between 0.06 inch and 0.33 inch. The present invention, however, is not limited to extruded tubing having any particular wall thickness.

Restoration of the tube end dimensions is achieved by heating the end 14 of core 12 to the softening temperature for the plastic material from which the core is made. The softening of the plastic provides for shaping of the core end 14 in the manner to be described in greater detail. The plastic material is preferably an olefin, and most preferably polypropylene having a softening temperature of approximately 325 degrees Fahrenheit. The invention is not limited to olefins, however.

The shaped end 14 of core 12 is then actively cooled at the curing station 18. The cooling of end 14 at the curing station 18 fixes the end 14 in its restored condition and prevents post-shaping distortions that might otherwise occur were the shaped core 12 simply removed from the molding station 16 for passive cooling to ambient. Also, the inclusion of a separate curing station 18 in device 10 provides a much faster process than would be possible for a single station in which the core was both heated for shaping and then cooled for curing. Additional time would inherently be built into a single station process for cyclically heating and cooling the shaping element of the single station in contrast to separate molding and curing stations 16, 18 requiring only heating means or cooling means, respectively.

The device 10 includes a core handling system 22 to provide sequential positioning of end 14 of core 12 at the molding station 16 and curing station 18. The core handling system 22 includes a carriage 24 slidably supported on upper first rails 26. The first rails 26 provide for translation of the carriage 24, to the left and right in the view shown in FIG. 1, for engagement and disengagement of the end 14 of core 12 with the stations 16, 18. The core handling system 22 further includes lower second rails 28, oriented transversely to the first rails 26. The second rails 28 support both the first rails 26 and the carriage 24 for translation to the left and right in the view shown in FIG. 2. This provides for alignment of the core 12 with the molding station 16 and the curing station 18. The construction and support for the core handling system 22 will be described in greater detail below.

The device 10 includes a drive system 30 for translation of the carriage 24 on the first and second rails 26, 28. The device 10 also includes a control system 32 for controlling the operation of the drive system 30. The control system 32 includes a main control panel 29 having control buttons 31 for starting and stopping the device 10. As will be described in greater detail, the control system 32 also provides for automatic control over multiple components and parameters of device 10 such as heating and cooling at the molding and curing stations 16, 18, respectively. The construction and operation of the drive system 30 and control system 32 will be described in greater detail below.

Figure 2:
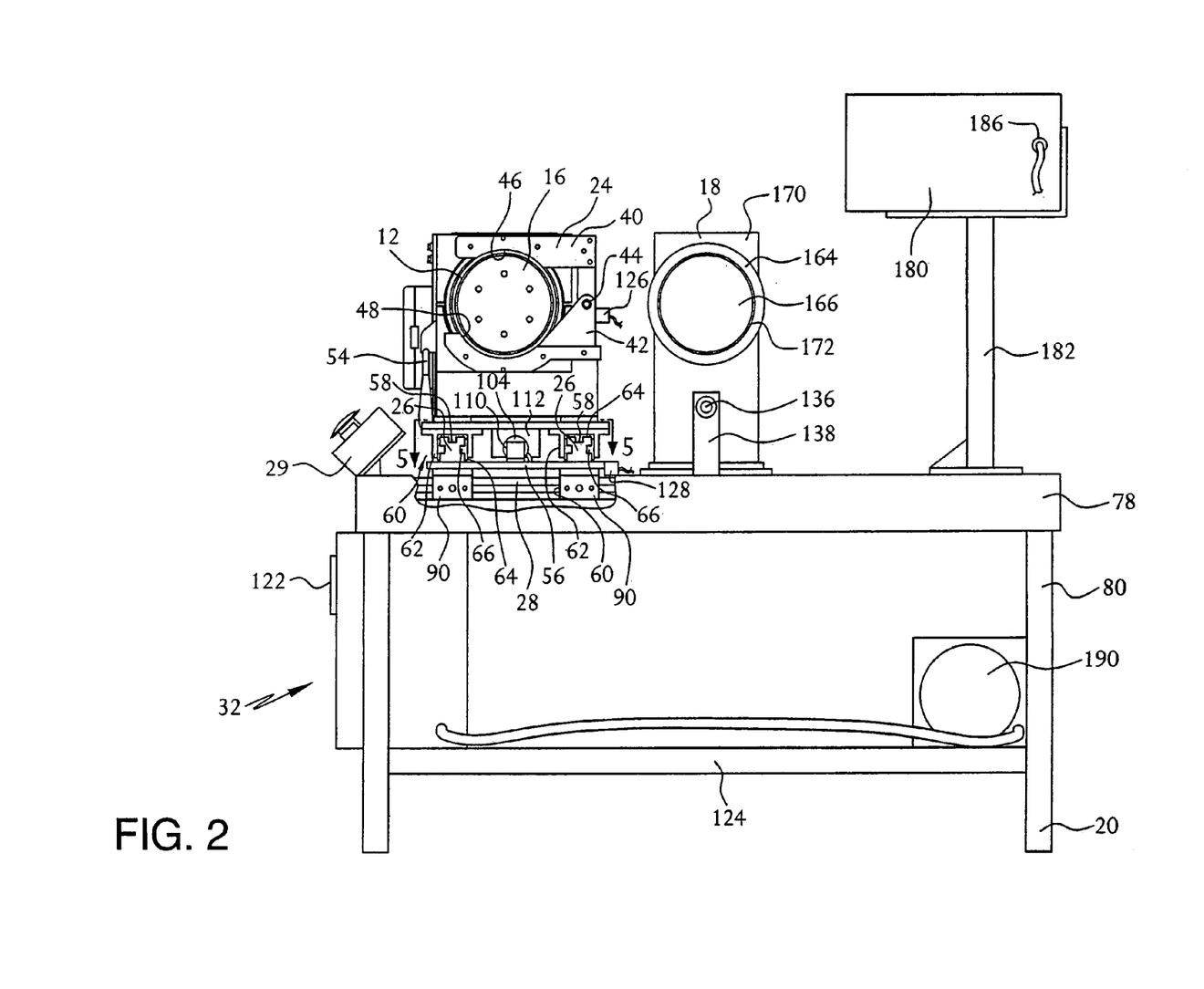
FIG. 2 is an end view of the apparatus of FIG. 1.

The carriage 24 of the core handling system 22 includes core-engaging supports 34, 36 located at opposite ends of the carriage 24 and a core-engaging support 38 located at the middle of the carriage 24. Referring to FIG. 2, the construction of the end support 36 is seen in greater detail. The end core-engaging support 36 includes upper and lower portions 40, 42, respectively, that are pivotably connected to each other by a pin joint 44. Each of the upper and lower portions 40, 42 defines a curved inner surface 46, 48, respectively, for engagement between the carriage 24 and the core 12 as shown in FIG. 2. The other core-engaging supports 34, 38 of the carriage 24 are constructed in a similar manner to support 36 and have upper and lower portions pivotably connected at pin joints and defining curved inner surfaces for engaging a supported core 12.

The carriage 24 also includes elongated upper and lower frame members 50, 52, respectively, interconnecting the three supports 34, 36, 38. The connection of the frame members 50, 52 to the core-engaging supports 34, 36, 38 forms a substantially rectangular box-like structure having upper and lower parts that are pivotable with respect to each other because of the pin-joint connection of the support portions. The carriage 24 further includes a latching clamp 54 located on an opposite side of the carriage 24 from the pin-joints for the supports 34, 36, 38. The latching clamp 54 is connected to the upper and lower frame members 50, 52 of carriage 24 adjacent to the middle support 38 for securing a core 12 received within the carriage 24.

Figure 1:
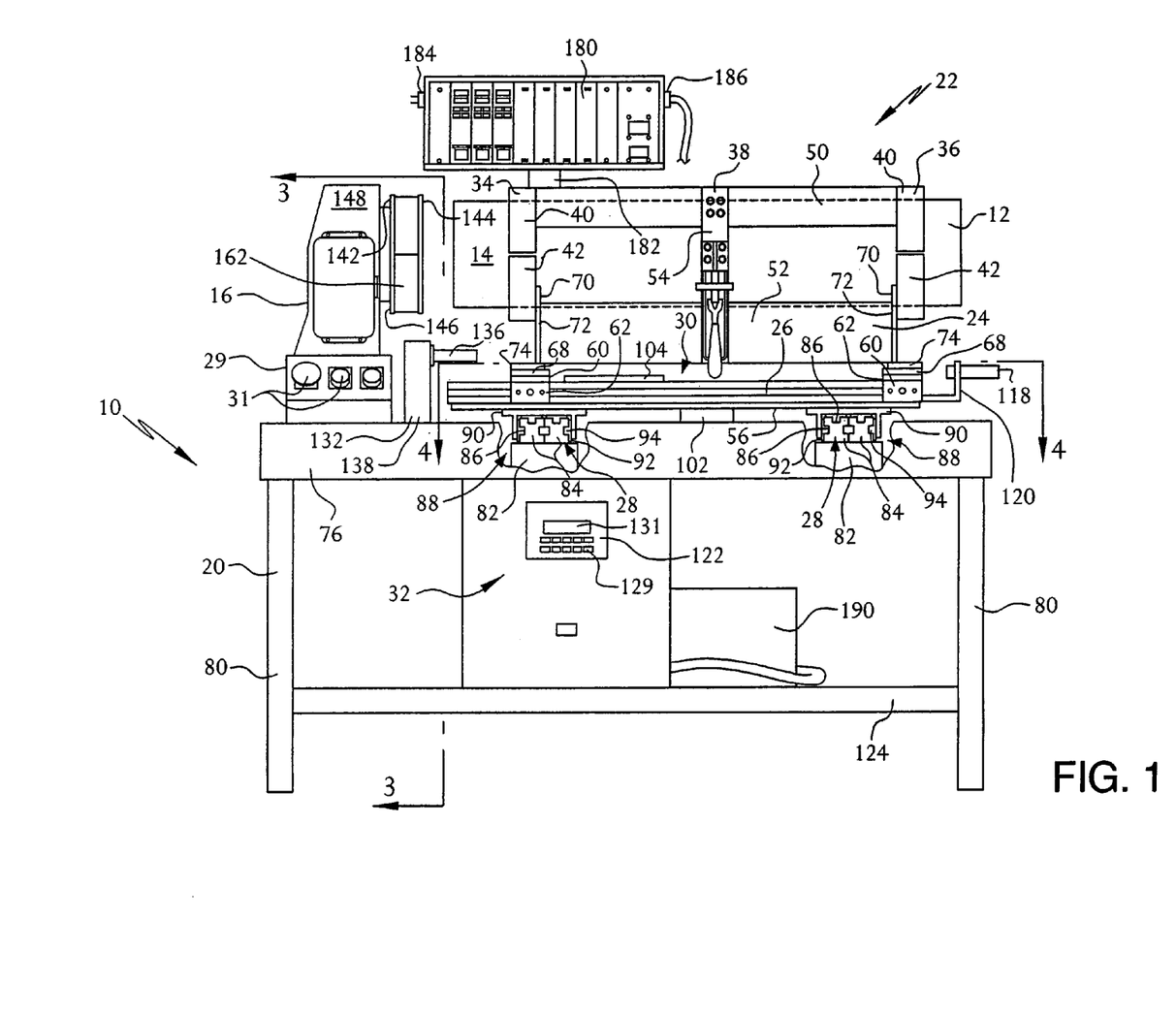
FIG. 1 is a side view of an apparatus for restoring a necked-down end of a plastic core according to the present invention.

Referring to FIGS. 1 and 2, the first rails 26 of the core handling system 22 are constructed and connected to the carriage 24 as follows. Each of the first rails 26 is secured to a rail support plate 56 to extend along an upper surface thereof. Each of the first rails 26 is generally square in cross section having notches 58 in its top and side surfaces. The core handling system 22 further includes slide assemblies 60 at each end of carriage 24 to provide a sliding connection between the carriage 24 and the first rails 26. The slide assemblies 60 include attachment brackets 62 having top and side walls defining a channel in which the first rails 26 are received. The slide assemblies 60 further include slide plates 64 located between the brackets 62 and the rails 26. The slide plates 64 have tabs 66 received by the notches 58 in first rails 26 to provide a sliding connection between slide assemblies 60 and the first rails 26.

The core handling system 22 includes carriage support plates 68 at opposite ends of the carriage 24. The carriage support plates 68 extend between the first rails 26 and are secured at their ends to the attachment brackets 62. The core handling system 22 further includes carriage footers 70 at opposite ends of the carriage 24 for supporting the carriage 24 at a distance above the carriage support plates 68. The footers 70 include vertical portions 72 secured to the end core-engaging supports 34, 36 and horizontal portions 74 secured to the carriage support plates 68.

The second rails 28 of the core handling system 22 are constructed and supported by the base structure 20 as follows. The base structure 20 includes longitudinal and lateral members 76, 78, respectively, forming a rectangular frame. The base structure further includes legs 80 supporting the members 76, 78. The second rails 28 are secured to crossbeams 82 that extend between the longitudinal members 76 of base structure 20. As shown in FIG. 1, each of the second rails 28 includes two rail members 84 located beside each other on one of the crossbeams 82. Each rail member 84 of the second rails 28 is similar to the first rails 26 being generally square in cross section and having notches 86 in top and side surfaces.

The core handling system 22 includes slide assemblies 88 providing for sliding connection between the rail support plate 56 and the second rails 28. Each of the slide assemblies 88 includes an attachment bracket 90 having top walls and side walls defining a channel. In a similar fashion to the slide assemblies 60, each of the slide assemblies 88 includes slide plates 92 having tabs 94 for receipt within the notches 86 of the rail members 84. The second rails 28 include four notches 86 confronting the attachment bracket 90 rather than three as was the case for the sliding connection to of attachment bracket 62 to the first rails 26. Accordingly, each of the slide assemblies 88 includes four slide plates 92 secured to the attachment bracket 90. The attachment brackets 90 of the slide assemblies 88 are secured to the rail support plate 56 to provide for translation of the carriage 24 and the first rails 26 on the second rails 28.

Figure 4:
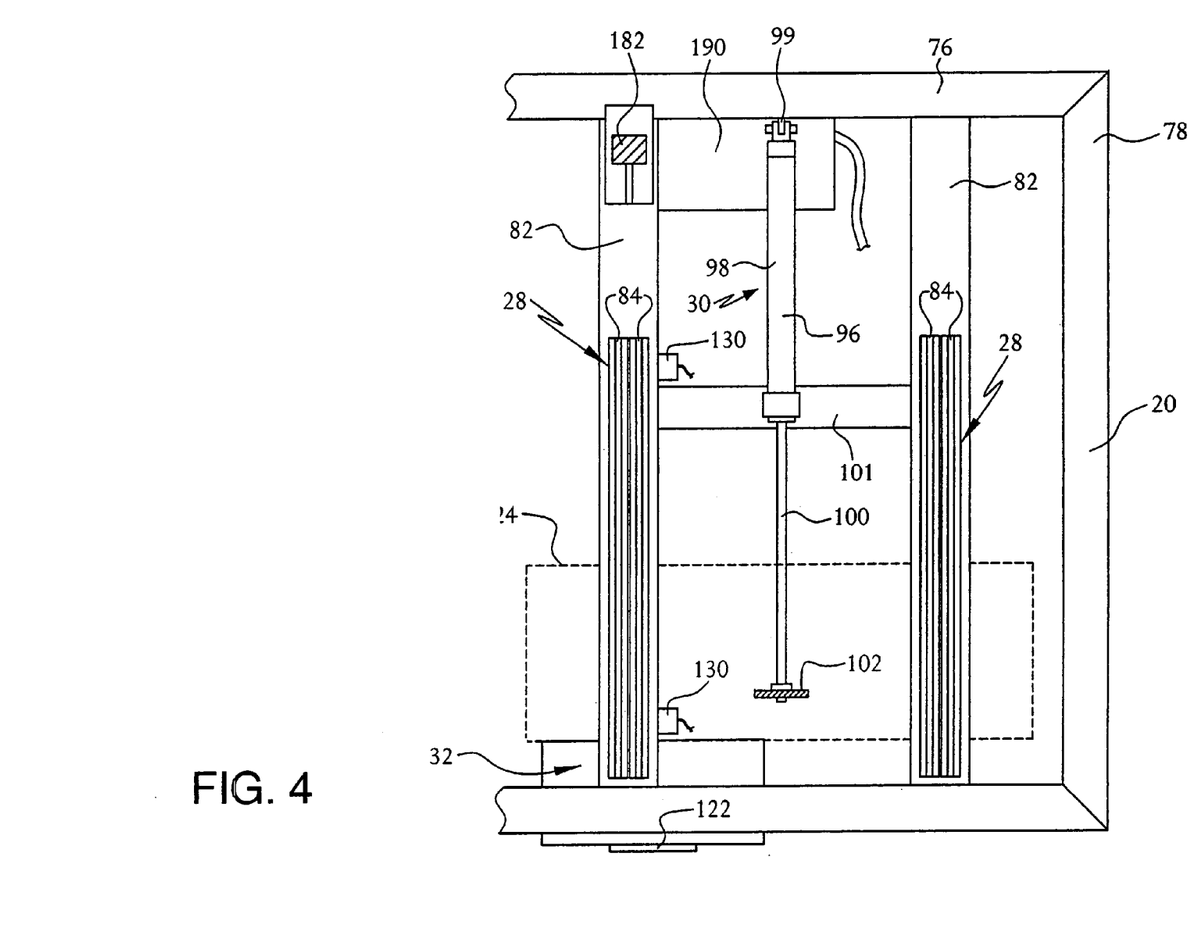
FIG. 4 is a sectional view taken along line 4—4 of FIG. 1.
Figure 5:
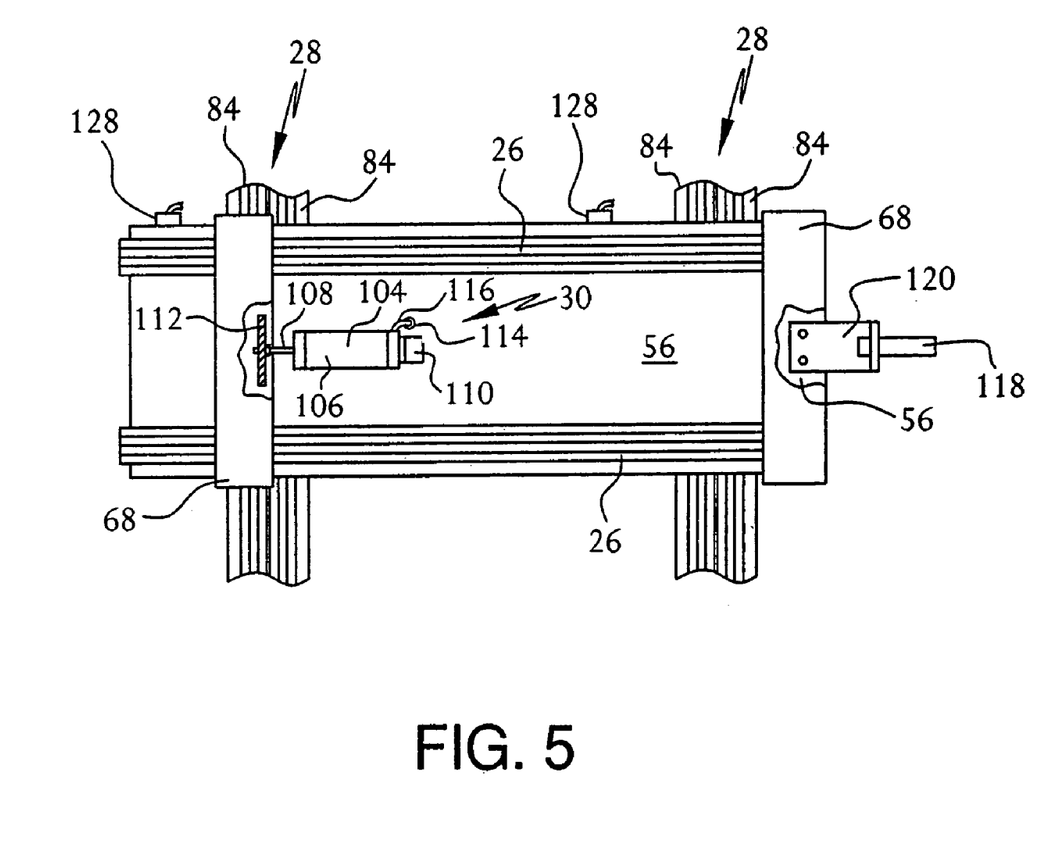
FIG. 5 is a sectional view taken along line 5—5 of FIG. 2.

Referring to FIGS. 4 and 5, the translation of carriage 24 with respect to the first and second rails 26, 28 is provided by drive system 30. As shown in FIG. 4, the drive system includes a first motor drive 96 having a base portion 98 secured to the base structure 20 and a shaft 100 telescopically driven from the base portion 98. The base portion 98 is pivotably connected at one end to a tab 99 secured to longitudinal frame member 76. The opposite end of the base portion 98 is supported on a frame member 101 extending between crossbeams 82. The shaft 100 of first motor drive 96 is secured at an end to a drive attachment plate 102 that extends downwardly from the rail support plate 56. Extension and retraction of the shaft 100 of first motor drive 96 with respect to base portion 98 translates the rail support plate 56 with respect to the second rails 28. The support of the first rails 26 on the rail support plate 56 results in translation of the carriage 24 with respect to the second rails 28 by the first motor drive 96. The first motor drive 96 is preferably a hydraulically driven motor. In the known manner, the motor includes an internal valve system (not shown) that provides for powered extension and retraction of the shaft 100 with respect to the base portion 98.

Referring to FIG. 5, the drive system 30 of device 10 further includes a second motor drive 104. Similar to the first motor drive 96, the second motor drive 104 has a base portion 106 and a shaft 108 telescopically driven with respect to the base portion 106. The base portion 106 of the second motor drive 104 is connected to a bracket 110 secured to the rail support plate 56. The shaft 108 of the second motor drive 104 is secured at an end to a drive attachment plate 112 that extends downwardly from one of the carriage support plates 68. Extension and retraction of the shaft 108 results in translation of the carriage 24, with respect to the first rails 26. In a similar fashion to the first motor drive 96, the second motor drive 104 is preferably a hydraulically driven motor having an internal valve system for extension and retraction of the shaft 108. The load requirements for the second motor drive 104 differ from those of the first motor drive 96 because the second motor drive 104 is only required to drive the carriage 24 along the upper first rails 26. Accordingly, as shown, a smaller hydraulic motor may be used for the second motor drive 104. An opening 114 in the rail support plate 56 provides for passage of cabling 116 to connect the second motor drive 104 to a power supply and to a hydraulic system, to be described in greater detail.

The device 10 includes a handle 118 for manual translation of the carriage 24 and first rails 26 with respect to the second rails 28. Although motor drive 96 provides for translation of carriage 24, the handle 118 allows for manual control to facilitate adjustment or calibration of the position of carriage 24, for example. The handle 118 is secured to a bracket 120 that is, in turn, bolted to the rail support plate 56 as shown in FIG. 5.

The control system 32 includes a programmable logic controller (PLC) 122 supported on a lower frame 124 of base structure 20 for automatic control of device 10. In the manner well known in the art, a processor of the PLC 122 is responsive to monitored signals representing control parameters for a variety of components and systems of device 10 for control by the PLC 122. Referring to FIG. 2, the device 10 includes a limit switch 126 that is secured to the carriage 24 adjacent to the pin joint 44 of the center core-engaging support 38. The limit switch 126 sends a signal to the PLC 122 to indicate status of the carriage 24 (i.e., to provide information to the PLC 122 regarding whether the carriage 24 is open or closed). Referring to FIGS. 2 and 5, the device 10 further includes limit switches 128 secured to the rail support plate 56 beneath the carriage 24. Each of the limit switches 128 provides a signal to the PLC 122 when the carriage 24 is driven to a particular position on the first rails 26 for automatic control over the operation of the second motor 104 by the PLC 122. Referring to FIG. 4, the device 10 also includes limit switches 130 secured to one of the crossbeams 82 adjacent the second rails 28. In a similar fashion to the limit switches 128, each of the limit switches 130 provides a signal to the PLC 122 when the carriage 24 and first rails 26 are driven to a particular position on the second rails 28. The signal provides for stoppage of the first motor 96 by the PLC 122 for automatic alignment of the core 12 with the stations 16, 18 by the PLC 122. A keypad 129 and a display 131 provide a user interface to the programmable logic controller 122. A suitable PLC 122 is the Fanus VersaMax sold by General Electric.

The processor of the PLC 122 uses position information received from the sensors to control the operation of the first motor drive 96 for automatic alignment of the carriage 24 with the stations 16, 18. The processor also controls the second motor drive 104 in response to position information from the sensors to control the position of the carriage 24 with respect to first rails 26. The control system 32 thus provides for automatic control over the engagement and disengagement of the core 12 with stations 16, 18 as well as sequential alignment of the core 12 with the stations.

Although the control system 32 provides for automatic control over translation of the carriage 24, the device 10 includes protective barricade members 132, 134 adjacent the stations 16, 18, respectively. The barricade members 132, 134 provide protection against damage to the stations 16, 18 that might result were a core 12, secured to the carriage 24, to impact one of the stations. Each of the protective barricade members 132, 134 includes a stop rod 136 extending from a support post 138 to provide for contact between the stop rod 136 and the vertical portion 72 of footer 70 of carriage 24. The support posts 138 of the barricade members 132, 134 are welded to frame member 140 extending between longitudinal members 76 of the base structure 20.

Figure 3:
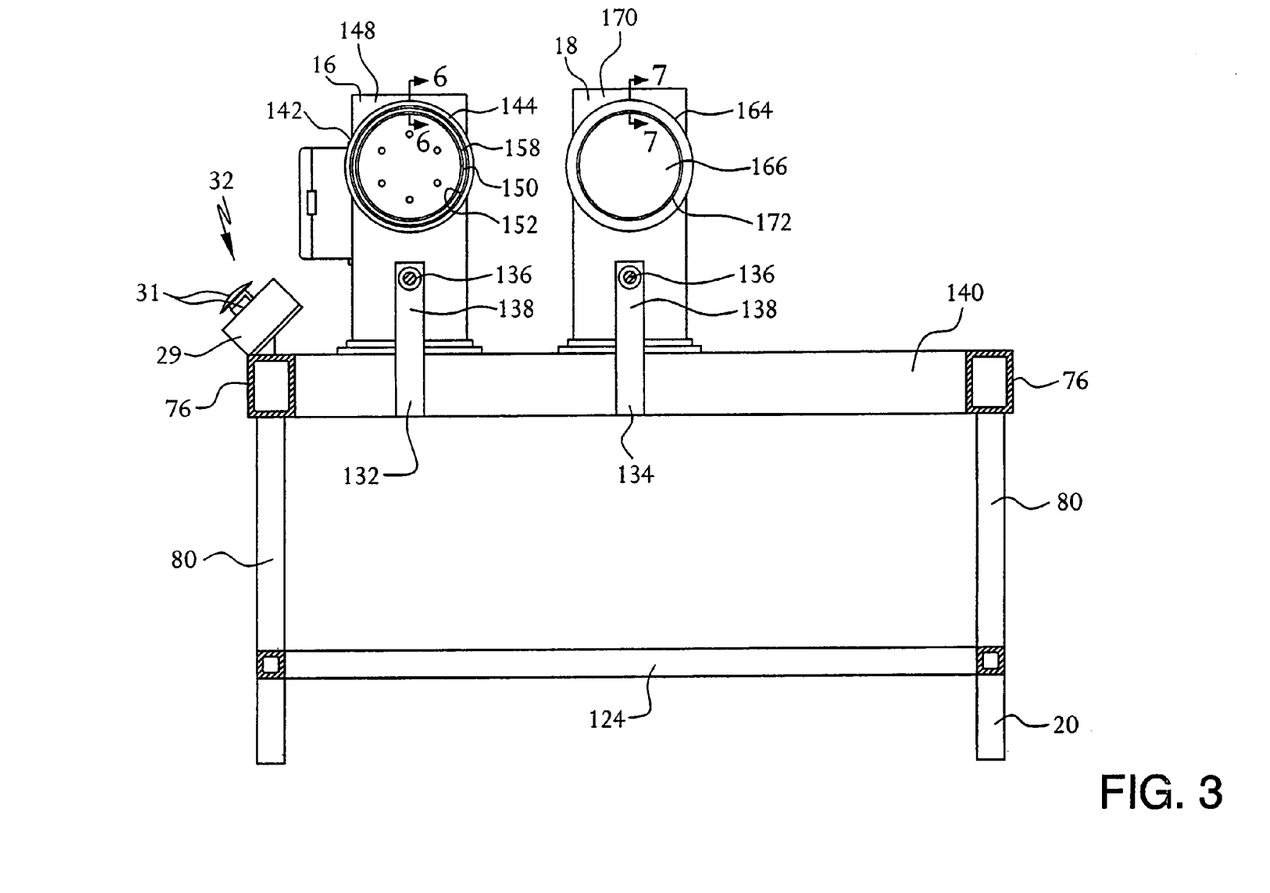
FIG. 3 is a sectional view taken along line 3—3 of FIG. 1.
Figure 6:
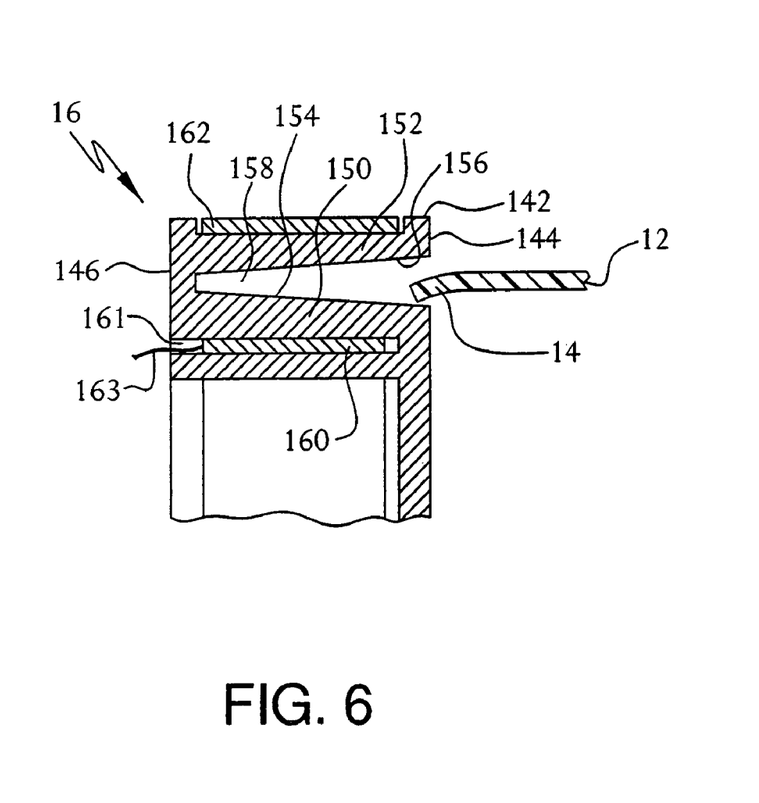
FIG. 6 is a sectional view taken along line 6—6 of FIG. 3 showing a necked-down end of a core received within the shaping chamber of the molding station.

Referring to FIGS. 3 and 6, the molding station 16 provides for heating and shaping of core 12 in the following manner. The molding station 16 includes a mold head 142 having front and rear sides 144, 146 supported by stand 148. The stand 148 is secured to frame member 140 and to the lateral member 78 of the base structure 20. The mold head 142 extends from the stand 148 at a distance from the base structure 20 providing for engagement between the mold head 142 and the core 12. As shown in FIG. 6, the mold head 142 includes inner and outer walls 150, 152 having surfaces 154, 156, respectively defining an annular shaping chamber 158 therebetween. Surface 154 of the inner wall 150 tapers outwardly from front side 144 while surface 156 of the outer wall 152 tapers inwardly. The surfaces 154, 156 taper towards respective diameters approximately equal to the nominal inner and outer diameters of core 12. As shown in FIG. 6, the tapering of the surfaces 154, 156 ensures that the necked down end 14 of core 12 is receivable within the annular shaping chamber 158.

As shown in FIG. 6, the molding station 16 includes heating elements providing sources of heat for maintaining a sufficiently elevated temperature within the annular shaping chamber for heat softening the end 14 of core 12 received in the annular shaping chamber 158. The heating elements include internal cartridge heaters 160 and an external band heater 162, respectively, for heating inner and outer walls 150, 152 on opposite sides of the annular shaping chamber 158. The band heater 162 is received in an annular recess formed in the outer wall 152 and is secured therein using a clamp (not shown) for example. Strip heaters could also conceivably be used as an alternative to the band heaters 162 shown. The cartridge heaters 160 include rod-shaped heating elements received in holes 161 formed in the inner wall 150. The cartridge heaters 160 include wiring 163 for connection of the heaters 160 to a power supply to be described below. To provide for uniform heating of the mold head 142, the cartridge heaters 160 are spaced around the mold head 142, preferably at six locations. The number of the cartridge heaters 160 used, however, is not critical and may vary depending on the particular heating requirements.

The device 10 may include sensors (not shown) for monitoring the temperature of the mold head 142 of molding station 16. The monitored temperature by the sensors could be used by the PLC 122 for maintaining a predetermined temperature for the mold head 142 input into the processor of the PLC 122.

Figure 7:
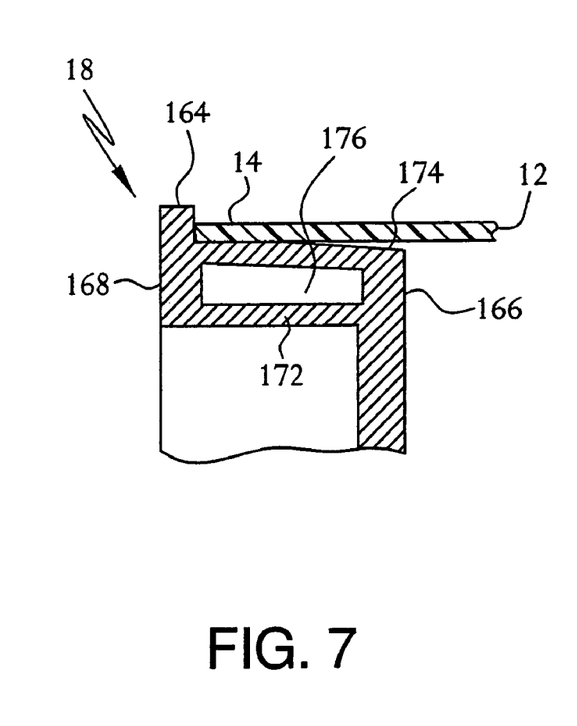
FIG. 7 is a sectional view taken along line 7—7 of FIG. 3 showing a restored core end received by the curing station.

Referring to FIGS. 3 and 7, the curing station 18 provides for fixation of the shaped end 14 as follows. The curing station 18 includes a fixation head 164 having front and rear sides 166, 168 supported by a stand 170. Similar to stand 148, the stand 170 for curing station 18 is secured to frame member 140 and to the lateral member 78 of the base structure 20. The fixation head 164 extends from the stand 170 at a distance from the base structure 20 providing for engagement between the fixation head 164 and the shaped end 14 of core 12. As shown in FIG. 7, the fixation head 164 includes wall portion 172 having an outer surface 174. The outer surface 174 of fixation head 164 is tapered, as shown in FIG. 7, from the front side 166 to facilitate receipt of the shaped end 14 of core 12.

The fixation head 164 includes an annular cooling chamber 176 defined within the wall portion 172. The cooling chamber 176 provides a pathway for directing a coolant medium, preferably chilled water, through the fixation head 164 to maintain the fixation head at a temperature suitably below ambient for rapid curing of the shaped end 14 of core 12. Preferably, the chilled water is maintained at a temperature of approximately 45 degrees Fahrenheit. Although chilled water is the presently preferred coolant, the present invention is not so limited and may be used with any suitable coolant, such as a mixture of water and ethylene glycol, for example. The fixation head 164 includes an inlet and outlet (not shown) for the chilled water. The device 10 is preferably connected to a facility source of chilled water. Alternatively, however, the device 10 could incorporate a separate closed system having a pump for circulation of a coolant to the fixation head 164.

The device 10 includes a heater control unit 180 that provides a power supply for the cartridge heaters 160 and controls their operation. The heater control unit 180 is supported on a platform 182 secured to the base structure 20. The control unit 180 is connected to facility power through power cable 184. Cabling 186 provides for connection between the control unit 180 and wiring 163 to supply power to, and control the operation of, the cartridge heaters 160.

Referring to FIGS. 1 and 2, the device 10 includes a hydraulic pump 190 supported on the lower frame 124 of base structure 20. The pump 190 is connected to the first and second motor drives 96, 104 by cabling (not shown) to supply pressurized hydraulic fluid to the motor drives to provide for the driven extension and retraction of shafts 100 and 108, respectively. As shown in FIG. 2, the pump 190 is also connected to the PLC 122 to provide for control by PLC 122 over the operation of the hydraulic pump 190.

The present invention provides for the use of relatively low cost plastic materials, most preferably polypropylene, for a film support core. The control system 32 of device 10 provides for automatic control over the operation of the heating elements 160, 162 to maintain the temperature of the shaping temperature 158 of the molding station 16 at approximately 325 degrees Fahrenheit, which is the softening temperature for polypropylene. The control system 32 also provides for automatic control over the drive system 30 to provide for rapid molding and curing of a necked-down end 14 of a core 12. Following loading and securing of a core 12 within carriage 14, the present invention provides for molding and curing of a necked-down end within a total process time of approximately 30 seconds.

The shaping of the core end 14 according to the method of the present invention provides additional benefits beyond the above-described restoration of the necked-down end to its nominal dimensions. The post extrusion shaping of the core end 14 also results in increased impact resistance for the core.

The foregoing describes the invention in terms of embodiments foreseen by the inventors for which an enabling description was available, notwithstanding that insubstantial modifications of the invention, not presently foreseen, may nonetheless represent equivalents thereto.

What is claimed is:

1. An apparatus for restoring a necked-down portion of a tubular plastic core to the nominal internal dimension of the core, the apparatus comprising:
   a molding station defining an annular shaping chamber having at least one surface engageable with the end of a core;
   a source of heat operably connected to the molding station to heat the surface of the shaping chamber;
   a curing station having a fixation member defining a surface engageable with at least the internal surfaces of the end of a core, the engagement surface being tapered with a maximum dimension substantially equal to the nominal inner dimension of the core;
   a cooling system operably connected to the curing station to cool the surface of the fixation member; and
   a core handling system for sequentially positioning the end of a core adjacent the molding station and the curing station, the core handling system comprising a carriage having at least one support member engageable with a core.

2. The apparatus according to claim 1 wherein the molding station comprises a stand having opposite front and rear sides and a mold member, the mold member connected to the stand such that it extends from the front side of the stand, the mold member including inner and outer wall portions having surfaces defining the annular shaping chamber.

3. The apparatus according to claim 2 wherein the source of heat comprises at least one heating element engaging one of the wall portions defining the annular shaping chamber.

4. An apparatus for restoring a necked-down portion of a tubular plastic core to the nominal internal dimension of the core, the apparatus comprising:
   a molding station defining an annular shaping chamber having at least one surface engageable with the end of a core, the molding station comprising a stand having opposite front and rear sides and a mold member, the mold member connected to the stand such that it extends from the front side of the stand, the mold member including inner and outer wall portions having surfaces defining the annular shaping chamber;
   a source of heat operably connected to the molding station to heat the surface of the shaping chamber, the source of heat comprising at least one external heating element contacting the outer wall portion and at least one cartridge heater received in a hole formed in the inner wall;
   a curing station having a fixation member defining a surface engageable with at least the internal surfaces of the end of a core, the engagement surface being tapered with a maximum dimension substantially equal to the nominal inner dimension of the core;
   a cooling system operably connected to the curing station to cool the surface of the fixation member; and
   a core handling system for sequentially positioning the end of a core adjacent the molding station and the curing station, the core handling system comprising a carnage having at least one support member engageable with a core.

5. The apparatus according to claim 1 wherein the curing station comprises a stand having opposite front and rear sides and wherein the fixation member is connected to the stand such that it extends from the front side of the stand.

6. The apparatus according to claim 1 wherein the fixation member comprises a wall portion defining the surface, the wall portion further defining a cooling chamber for directing a coolant through the fixation member.

7. The apparatus according to claim 1 wherein the core handling system further comprises first rails, the carriage slidably connected to the first rails to provide for engagement and disengagement between the stations and a core supported by the carriage.

8. An apparatus for restoring a necked-down portion of a tubular plastic core, the apparatus comprising:
   a molding station defining an annular shaping chamber having at least one surface engageable with the end of a core;
   a source of heat operably connected to the molding station to heat the surface of the shaping chamber;
   a curing station having a fixation member defining a surface engageable with the end of a core;
   a cooling system operably connected to the curing station to cool the surface of the fixation member;
   a core handling system for sequentially positioning the end of a core adjacent the molding station and the curing station, the core handling system comprising
      a carriage having at least one support member engageable with a core,
      first rails, the carriage slidably connected to the first rails to provide for engagement and disengagement between the stations and a core supported by the carriage,
      a rail support plate connected to the first rails, and
      second rails oriented perpendicular to the first rails, the rail support plate slidably connected to the second rails for alignment between the stations and a core supported by the carriage.

9. The apparatus according to claim 8 wherein the core handling system further comprises a first motor drive connected to the rail support plate for powered translation of the rail support plate with respect to the second rails, the core handling system further comprising a second motor drive secured to the rail support plate, the second motor drive connected to the carriage for powered translation of the carriage with respect to the first rails.

10. The apparatus according to claim 1 further comprising a control system including a programmable logic controller, the programmable logic controller having a processor responsive to control signals representing operating parameters for at least one component or system for control by the control system.

11. A molding machine for restoring a necked-down end of a plastic tube, the machine comprising:
   a molding station having inner and outer walls defining an annular shaping chamber adapted for receiving and restoring a necked-down end of a plastic tube;
   heating elements positioned adjacent the inner and outer walls of the annular shaping chamber, the heating elements including at least one external heating element in contact with a surface of the outer wall and at least one heating element received in a hole formed in the inner wall;
   a curing station spaced from the molding station, the curing station having a fixation member defining a surface adapted for engagement with at least the internal diameter of a necked-down tube, the fixation member defining an annular chamber providing for receipt of a coolant by the fixation member; and a tube handling system providing for sequential alignment of the necked-down tube with the molding station and the curing station; and a control system having a programmable logic controller providing for automatic control of the heating elements and for automatic control of the tube handling system.

12. A molding machine for restoring a necked-down end of a plastic tube, the machine comprising:

a molding station having inner and outer walls defining an annular shaping chamber adapted for receiving and restoring a necked-down end of a plastic tube;

heating elements received by the inner and outer walls to provide for heating of the annular shaping chamber, the heating elements including at least one external heating element in contact with a surface of the outer wall and at least one heating element received in a hole formed in the inner wall;

a curing station spaced from the molding station, the curing station having a fixation member defining a surface adapted for engagement with a restored end of a necked-down tube, the fixation member defining an annular chamber providing for receipt of a coolant by the fixation member; and a tube handling system providing for sequential alignment of the necked-down tube with the molding station and the curing station; the tube handling system comprising a carnage adapted for support of a necked-down tube and first rails slidably supporting the carriage for movement of the tube towards and away from one of the stations, the tube handling system further comprising second rails slidably supporting the first rails, the second rails being perpendicular to the first rails for aligning the tube with the molding station and the curing station; and a control system having a programmable logic controller providing for automatic control of the heating elements and for automatic control of the tube handling system.

13. The molding machine according to claim 12, wherein the carriage includes tube-engaging supports each having upper and lower portions pivotably connected at a pin joint to provide for open and closed conditions of the carriage for loading a necked-down tube, and wherein the control system includes a limit switch adjacent the pin joint of one of the supports to provide a signal to the programmable logic controller representing the condition of the carriage, the control system further including at least one limit switch adjacent each of the first and second rails to provide a signal to the programmable logic controller representing the position of the carriage with respect to the first and second rails, respectively.

14. The molding machine according to claim 12, wherein the tube handling system includes first and second drive motors, the first drive motor operably connected to the first rails for translation of the first rails with respect to the second rails, the second drive motor operably connected to the carriage for translation of the carriage with respect to the carriage with respect to the first rails.

15. The molding machine according to claim 14, wherein each of the first and second motors includes a telescopically driven shaft.

16. The molding machine according to claim 12, wherein the tube handling system includes slide assemblies for slidably connecting the carriage to the first rails and for slidably connecting the second rails to the first rails, each of the slide assemblies including a bracket defining a channel in which an associated rail is received and at least one slide plate located between the bracket and the associated rail, each of the slide plates including at least one tab received by a notch formed in the associated rail.

* * * * *